(12) United States Patent
Ohzono

(10) Patent No.: US 7,316,490 B2
(45) Date of Patent: Jan. 8, 2008

(54) SADDLE-RIDE TYPE VEHICLE

(75) Inventor: Gen Ohzono, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 203 days.

(21) Appl. No.: 11/234,064

(22) Filed: Sep. 23, 2005

(65) Prior Publication Data

US 2006/0077676 A1    Apr. 13, 2006

(30) Foreign Application Priority Data

Sep. 24, 2004 (JP) ............... 2004-278497

(51) Int. Cl.
*B62J 6/00* (2006.01)
*B62J 6/04* (2006.01)
(52) U.S. Cl. .............. 362/473; 362/549; 362/457
(58) Field of Classification Search ........ 362/368, 362/370, 457, 459, 473, 475, 476, 483, 487, 362/541, 546, 548, 549
See application file for complete search history.

(56) References Cited

U.S. PATENT DOCUMENTS 7,055,993 B2 * 6/2006 Farrow et al. ............. 362/473
7,188,980 B2 * 3/2007 Ase et al. ................. 362/476

FOREIGN PATENT DOCUMENTS

JP      05-278655      10/1993
JP      2006142874 A * 6/2006

* cited by examiner

*Primary Examiner*—Y. My Quach-Lee
(74) *Attorney, Agent, or Firm*—Hogan & Hartson LLP

(57) ABSTRACT

A saddle-ride type vehicle is provided capable of making a mount construction of a lamp unit simple and lessening a possibility that a projection provided on a vehicle body cover is damaged. The saddle-ride type vehicle includes a vehicle body cover that covers a vehicle body of the saddle-ride type vehicle from outside the saddle-ride type vehicle. A protrusive projection is mounted to the vehicle body. A grommet having a cylinder holds the projection. A frame including a frame side mount is provided with a frame side mount hole. A rear lamp unit including a rear lamp side mount is provided with a rear lamp side mount hole. The grommet is inserted into the frame side mount hole and the rear lamp side mount hole. The cylinder is opened in a direction, in which the grommet is inserted into the frame side mount hole and the rear lamp side mount hole, and the projection is inserted into the cylinder.

6 Claims, 6 Drawing Sheets

SADDLE-RIDE TYPE VEHICLE

BACKGROUND OF THE INVENTION

1. Field of the Invention

The present invention relates to a saddle-ride type vehicle, such as motorcycle, etc., on which an operator assumes a posture to straddle a saddle, and more particular, to a mount construction of a lamp unit of a saddle-ride type vehicle.

2. Description of Related Art

Conventionally, a saddle-ride type vehicle comprising a frame that constitutes a framework of the saddle-ride type vehicle, a vehicle body cover that covers a vehicle body of the saddle-ride type vehicle from outside the saddle-ride type vehicle, and a lamp unit (rear lamp unit) mounted to a rear part of the frame, is known as a saddle-ride type vehicle, such as motorcycle, etc., on which an operator assumes a posture to straddle a saddle, and which has two to four wheels.

Also, the vehicle body cover described above comprises a projection that projects inward in the saddle-ride type vehicle, and the lamp unit comprises a lamp side mount provided with a lamp side mount hole, into which the projection provided on the vehicle body cover is inserted from outside the saddle-ride type vehicle.

In this manner, the vehicle body cover is mounted to the frame and the lamp unit from outside the saddle-ride type vehicle to thereby decorate an outward appearance of the saddle-ride type vehicle (for example, Japanese Patent Publication No. 3173118).

Also, with the saddle-ride type vehicle, positioning of the lamp unit and the vehicle body cover is easy since the projection of the vehicle body cover is inserted only into the lamp side mount of the lamp unit.

With conventional saddle-ride type vehicles, however, a weight of the lamp unit cannot be born only by the projection of the vehicle body cover, so that in order to bear the weight of the lamp unit, there is caused a need of screwing (for example, four locations) the lamp unit to the frame, or the like whereby a mount construction of the lamp unit is complex.

Also, when locations, in which the lamp unit is mounted to the frame, or the like, are reduced in order to simplify the mount construction of the lamp unit, there is caused a possibility (for example, a possibility that the projection breaks near the root) that the projection provided on the vehicle body cover is damaged by vibrations etc. generated while the saddle-ride type vehicle travels.

SUMMARY OF THE INVENTION

Hereupon, the invention has been thought of in order to solve the problem described above, and has its object to provide a saddle-ride type vehicle capable of making a mount construction of a lamp unit simple and lessening a possibility that a projection provided on a vehicle body cover is damaged.

A first feature of the invention resides in a saddle-ride type vehicle comprising a vehicle body cover that covers a vehicle body of the saddle-ride type vehicle from outside the saddle-ride type vehicle and comprises a protrusive projection being mounted to the vehicle body, a columnar-shaped member having a cylinder that holds the projection, a frame including a frame side mount provided with a frame side mount hole, and a lamp unit including a lamp side mount provided with a lamp side mount hole, and wherein the columnar-shaped member is inserted into the frame side mount hole and the lamp side mount hole, and shaped such that a length thereof in a direction of insertion, in which the columnar-shaped member is inserted into the frame side mount hole and the lamp side mount hole, is equal to or larger than a distance between the frame side mount and the lamp side mount in the direction of insertion, which includes the frame side mount and the lamp side mount, the cylinder is opened in the direction of insertion, and the projection is inserted into the cylinder and shaped such that a length thereof in the direction of insertion is equal to or larger than a distance between the frame side mount and the lamp side mount in the direction of insertion.

According to the feature, the columnar-shaped member is inserted into the frame side mount hole and the lamp side mount hole to thereby enable temporarily fixing the lamp unit to the frame.

Accordingly, the projection on the vehicle body cover is inserted into the cylinder of the columnar-shaped member, which temporarily fixes the lamp unit to the frame, whereby three members composed of the lamp unit, the frame, and the vehicle body cover can be readily assembled together (a mount construction of the lamp unit is simplified).

Also, the columnar-shaped member having the cylinder, into which the projection of the vehicle body cover is inserted, is held by the frame side mount as well as the lamp side mount whereby it is possible to lessen a possibility that the projection of the vehicle body cover is damaged by vibrations, etc. generated while the saddle-ride type vehicle travels.

A second feature of the invention adds to the first feature of the invention a construction, in which the frame side mount hole is a slot, of which length in a long-length direction of the vehicle body cover is larger than a length of the columnar-shaped member, inserted into the frame side mount hole, in the long-length direction of the vehicle body cover, and of which length in a short-length direction of the vehicle body cover is substantially the same as that of the columnar-shaped member, inserted into the frame side mount hole, in the short-length direction of the vehicle body cover.

According to the feature, the frame side mount hole is a slot, of which length in a long-length direction of the vehicle body cover is larger than a length of the columnar-shaped member in the long-length direction of the vehicle body cover (that is, there is a play in the long-length direction of the vehicle body cover), whereby a fitting position, in which the cylinder of the columnar-shaped member inserted into the frame side mount hole and the lamp side mount hole and the projection of the vehicle body cover fit together, can be readily adjusted by the frame side mount hole (a play).

That is, hole misregistration generated by a dimensional difference of the frame, the vehicle body cover, etc. is lessened, so that the work of assembling three members composed of the lamp unit, the frame, and the vehicle body cover together is facilitated further (a mount construction of the lamp unit is further simplified).

Also, a length of the frame side mount hole in the short-length direction of the vehicle body cover is substantially the same as that of the columnar-shaped member in the short-length direction of the vehicle body cover whereby the frame side mount can restrict movements of the columnar-shaped member in the short-length direction of the vehicle body cover. That is, positioning of the vehicle body cover and the frame in the short-length direction of the vehicle body cover is enhanced in accuracy.

A third feature of the invention adds to the first feature of the invention a construction, in which the lamp side mount hole is a hole, of which length in a long-length direction of the vehicle body cover is substantially the same as that of the columnar-shaped member, inserted into the lamp side mount hole, in the long-length direction of the vehicle body cover, and of which length in a short-length direction of the vehicle body cover is substantially the same as that of the columnar-shaped member, inserted into the lamp side mount hole, in the short-length direction of the vehicle body cover.

According to the feature, lengths of the lamp side mount hole in the long-length direction of the vehicle body cover and in the short-length direction of the vehicle body cover are substantially the same as those of the columnar-shaped member in the long-length direction of the vehicle body cover and in the short-length direction of the vehicle body cover, whereby the lamp side mount can restrict movements of the columnar-shaped member in the long-length direction of the vehicle body cover and in the short-length direction of the vehicle body cover. That is, positioning of the vehicle body cover and the lamp unit in the long-length direction of the vehicle body cover and in the short-length direction of the vehicle body cover is enhanced in accuracy.

A fourth feature of the invention adds to the first feature of the invention a construction, in which the lamp side mount is arranged further outside the saddle-ride type vehicle than the frame side mount.

According to the feature, the frame side mount supports the projection of the vehicle body cover on a tip end side (inside the saddle-ride type vehicle) of the projection of the vehicle body cover whereby the frame side mount can lessen stress applied to a root side (outside the saddle-ride type vehicle) of the projection of the vehicle body cover.

A fifth feature of the invention adds to the first feature of the invention a construction, in which the columnar-shaped member comprises a drum portion held by the lamp side mount and the frame side mount, an inner end positioned further inside the saddle-ride type vehicle than the drum portion, and an outer end positioned further outside the saddle-ride type vehicle than the drum portion, at least a part of a cross section of the inner end in parallel to an opened surface of the cylinder extends outwardly of a cross section of the drum portion in parallel to the opened surface, at least a part of a cross section of the outer end in parallel to the opened surface extends outwardly of the cross section of the drum portion in parallel to the opened surface, and a length of the drum portion in the direction of insertion is substantially the same as a distance between the frame side mount and the lamp side mount in the direction of insertion.

According to the feature, a length of the drum portion in the direction of insertion is substantially the same as a distance between the frame side mount and the lamp side mount in the direction of insertion, whereby the inner end (a convex portion) and the outer end (a convex portion) can restrict movements of the columnar-shaped member, which is interposed by the inner end and the outer end, in the direction of insertion.

Accordingly, positioning of the frame side mount and the lamp side mount in the direction of insertion of the columnar-shaped member is enhanced in accuracy.

In addition, a part (a convex portion) of the inner end extending outwardly of the cross section of the drum portion in parallel to the opened surface is preferably made of an elastic member such as rubber, etc. so that the columnar-shaped member can be inserted into the frame side mount hole or the lamp side mount hole.

A sixth feature of the invention adds to the first feature of the invention a construction, in which the columnar-shaped member comprises a drum portion held by the lamp side mount and the frame side mount, and an inner end positioned further inside the saddle-ride type vehicle than the drum portion, at least a part of a cross section of the inner end in parallel to an opened surface of the cylinder extends outwardly of a cross section of the drum portion in parallel to the opened surface, and a length of the inner end in the direction of insertion is equal to or less than that spacing between the frame side mount and the lamp side mount in the direction of insertion, which does not include the frame side mount and the lamp side mount.

According to the feature, a length of the inner end in the direction of insertion is equal to or less than that spacing between the frame side mount and the lamp side mount in the direction of insertion, which does not include the frame side mount and the lamp side mount, whereby after the columnar-shaped member is once inserted into the lamp side mount hole (or the frame side mount hole), the columnar-shaped member can be slid along the frame side mount (or the lamp side mount).

Also, at least a part of the cross section of the inner end in parallel to the opened surface of the cylinder extends outwardly of the cross section of the drum portion in parallel to the opened surface, whereby when the columnar-shaped member is once inserted into the lamp side mount hole (or the frame side mount hole), the inner end (a convex portion) is caught by the lamp side mount (or the frame side mount) and so the columnar-shaped member becomes hard to come off from the lamp side mount hole (or the frame side mount hole).

Accordingly, the work of temporarily fixing the lamp unit to the frame by means of the columnar-shaped member is made easy.

In addition, a part (a convex portion) of the inner end extending outwardly of the cross section of the drum portion in parallel to the opened surface is preferably made of an elastic member such as rubber, etc. so as to make insertion of the columnar-shaped member into the lamp side mount hole easy.

According to the invention, it is possible to provide a saddle-ride type vehicle capable of making a mount construction of a lamp unit simple and lessening a possibility that a projection provided on a vehicle body cover is damaged.

Figure 1:
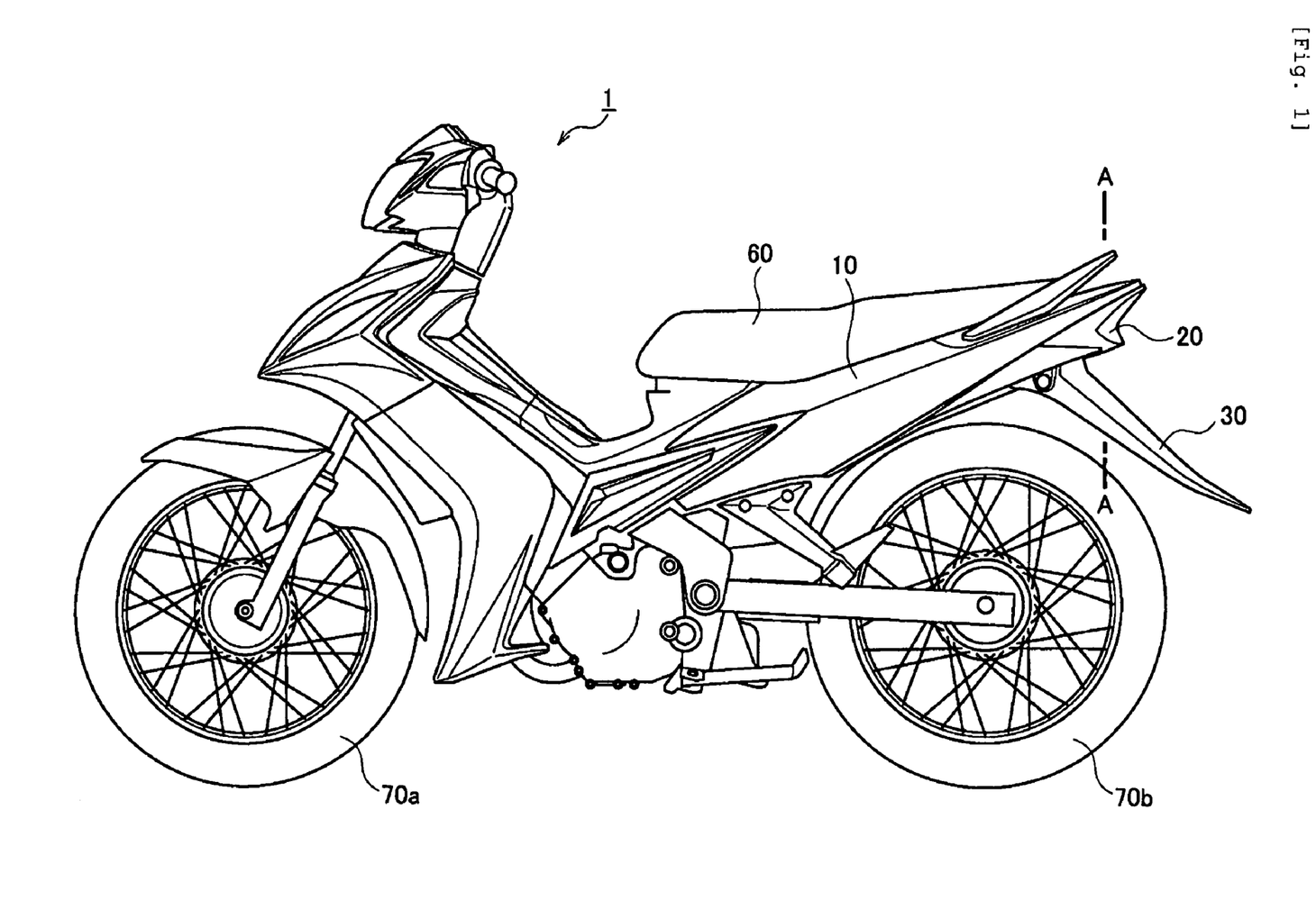
FIG. 1 is a view showing an outward appearance of a saddle-ride type vehicle 1 according to an embodiment of the invention.

DETAILED DESCRIPTION OF THE INVENTION (Construction of a saddle-ride type vehicle according to an embodiment of the invention). A saddle-ride type vehicle according to an embodiment of the invention will be described below with reference to the drawings. In addition, a saddle-ride type vehicle indicates a motorcycle, etc., on which an operator assumes a posture to straddle a saddle and which has two to four wheels. FIG. 1 is a view showing an outward appearance of a saddle-ride type vehicle 1 according to an embodiment of the invention.

As shown in FIG. 1, the saddle-ride type vehicle 1 comprises a frame (not shown in FIG. 1) that constitutes a framework of the saddle-ride type vehicle 1, a vehicle body cover 10 that covers a vehicle body of the saddle-ride type vehicle 1 from outside the saddle-ride type vehicle 1, a rear lamp unit 20 having a tail lamp, etc., a fender 30 mounted to a rear part of the frame, a seat 60 straddled by an operator, and two wheels (a wheel 70a and a wheel 70b).

Figure 2:
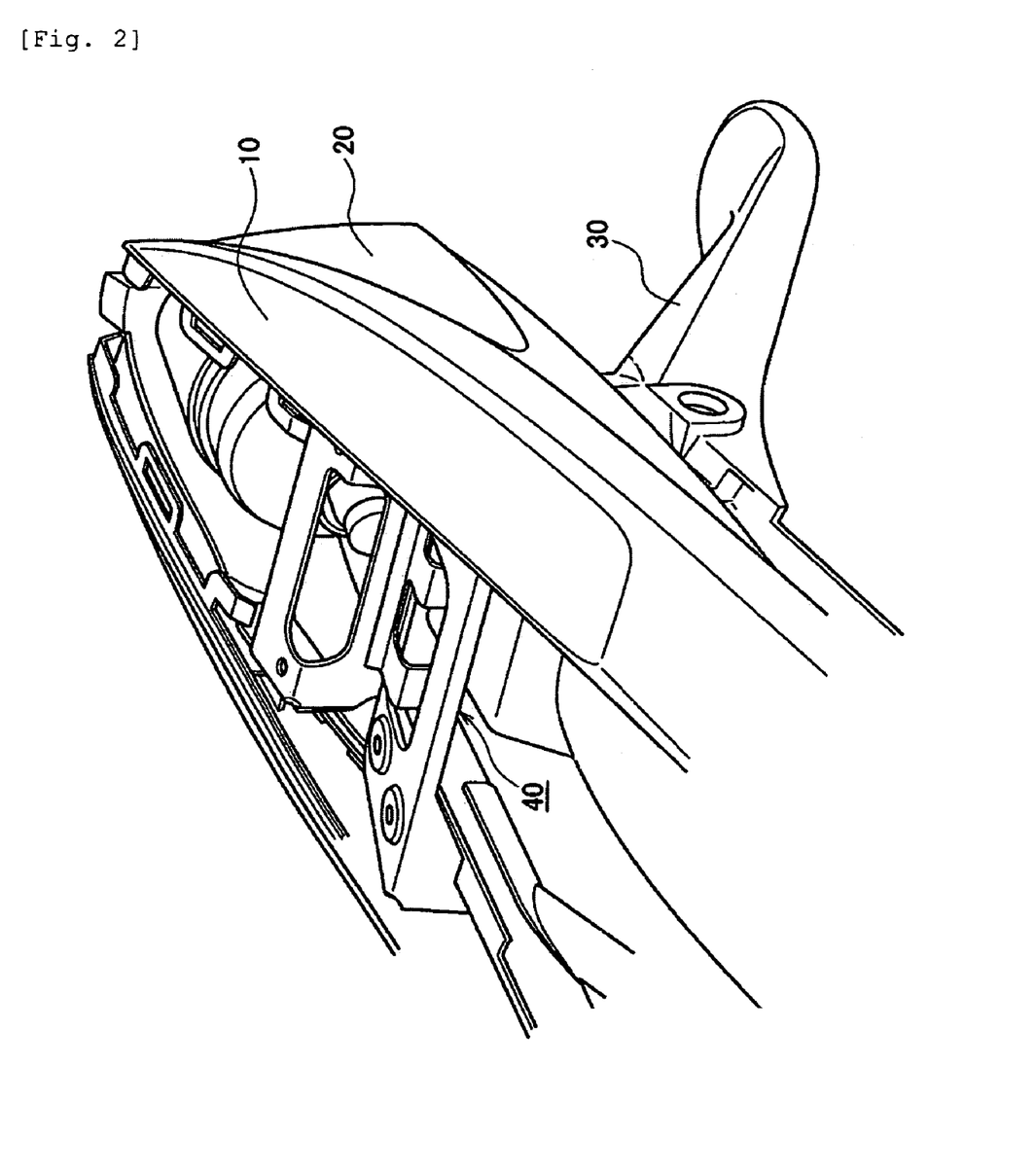
FIG. 2 is a perspective view showing an outward appearance of a rear part of the saddle-ride type vehicle 1 according to the embodiment of the invention.

An explanation will be given below to a rear part of the saddle-ride type vehicle 1 according to the embodiment of the invention. FIG. 2 is a perspective view showing an outward appearance of the rear part of the saddle-ride type vehicle 1 according to the embodiment of the invention. In addition, the seat 60, etc. are omitted in FIG. 2 for the purpose of facilitating an explanation.

As shown in FIG. 2, mounted to the rear part of the saddle-ride type vehicle 1 are the vehicle body cover 10, the rear lamp unit 20, and the fender 30. In addition, the vehicle body cover 10, the rear lamp unit 20, and the fender 30 are mounted to a frame 40.

Figure 3:
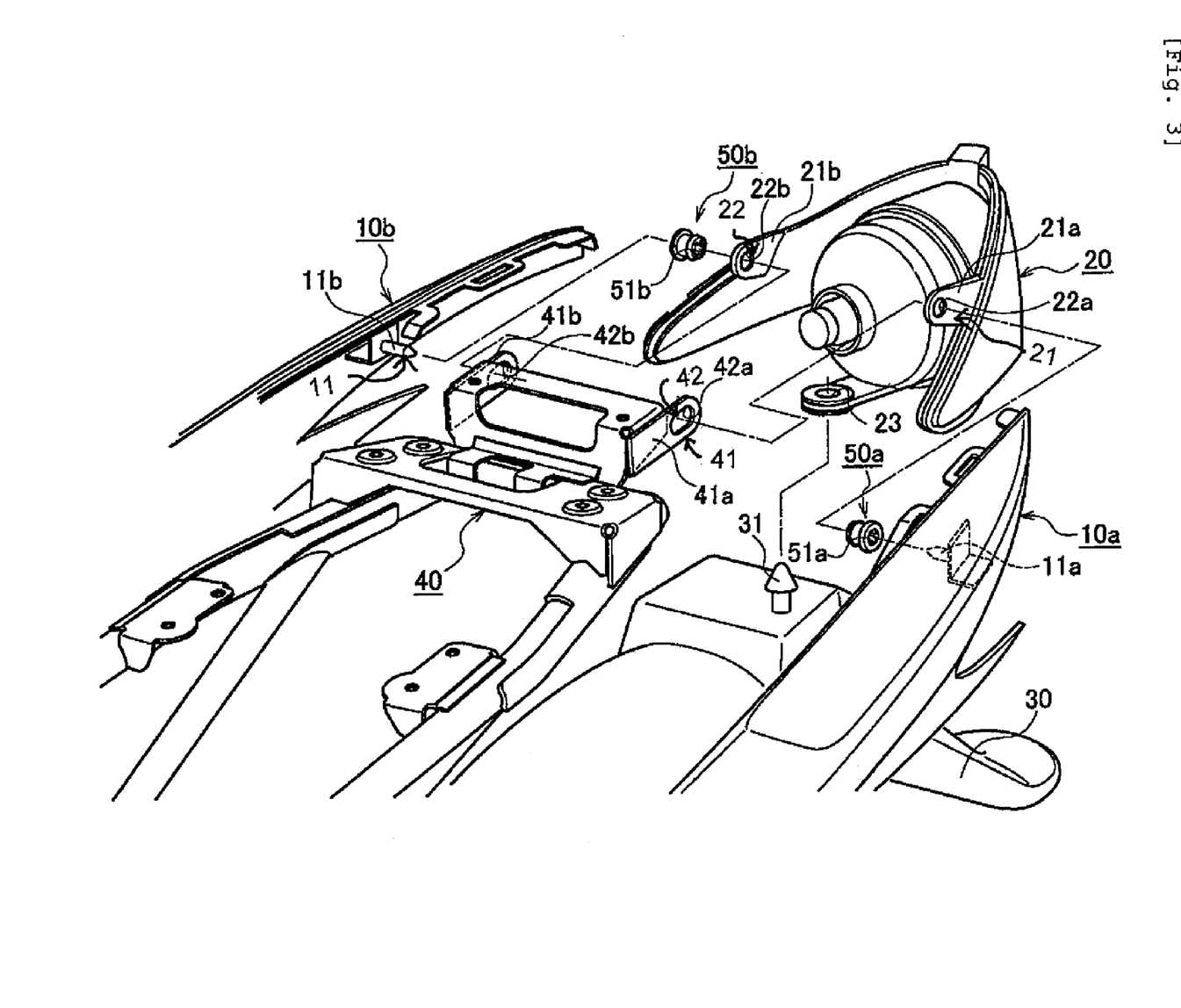
FIG. 3 is an exploded, perspective view showing the rear part of the saddle-ride type vehicle 1 according to the embodiment of the invention (first).

A way of mounting the vehicle body cover 10 and the rear lamp unit 20 to the frame 40 will be described below with reference to the drawings. FIG. 3 is an exploded, perspective view showing the rear part of the saddle-ride type vehicle 1 according to the embodiment of the invention.

As shown in FIG. 3, the vehicle body cover 10 is composed of a left vehicle body cover 10a that covers a vehicle body on the left in a traveling direction of the saddle-ride type vehicle 1, and a right vehicle body cover 10b that covers a vehicle body on the right in the traveling direction of the saddle-ride type vehicle 1.

Also, the left vehicle body cover 10a comprises a projection 11a, by which the left vehicle body cover 10a is mounted to a vehicle body of the saddle-ride type vehicle 1. Likewise, the right vehicle body cover 10b comprises a projection 11b, by which the right vehicle body cover 10b is mounted to the vehicle body of the saddle-ride type vehicle 1.

In addition, the projection 11a projects inward in a widthwise direction of the saddle-ride type vehicle 1 and shaped so that a length thereof in the widthwise direction of the saddle-ride type vehicle 1 is equal to or larger than a distance ((b' described later) between a rear lamp side mount 21 and a frame side mount 41. Likewise, the projection 11b projects inward in the widthwise direction of the saddle-ride type vehicle 1 and shaped so that a length thereof in the widthwise direction of the saddle-ride type vehicle 1 is equal to or larger than a distance ((b' described later) between the rear lamp side mount 21 and the frame side mount 41. In addition, the projection 11a and the projection 11b are referred generally to as projection 11.

The rear lamp unit 20 comprises a rear lamp side mount 21a provided with a rear lamp side mount hole 22a, into which a grommet 50a described later is inserted, a rear lamp side mount 21b provided with a rear lamp side mount hole 22b, into which a grommet 50b described later is inserted, and a mount hole 23, into which a projection 31 of the fender 30 is inserted.

Also, the rear lamp side mount hole 22a is a hole, of which length in a long-length direction of the left vehicle body cover 10a is substantially the same as that of the grommet 50a, inserted into the rear lamp side mount hole 22a, in the long-length direction of the left vehicle body cover 10a, and of which length in a short-length direction of the left vehicle body cover 10a is substantially the same as that of the grommet 50a, inserted into the rear lamp side mount hole 22a, in the short-length direction of the left vehicle body cover 10a.

Likewise, the rear lamp side mount hole 22b is a hole, of which length in a long-length direction of the right vehicle body cover 10b is substantially the same as that of the grommet 50a, inserted into the rear lamp side mount hole 22b, in the long-length direction of the right vehicle body cover 10b, and of which length in a short-length direction of the right vehicle body cover 10b is substantially the same as that of the grommet 50a, inserted into the rear lamp side mount hole 22b, in a short-length direction of the rear lamp side mount hole 22b.

In addition, the rear lamp side mount 21a and the rear lamp side mount 21b are referred generally to as rear lamp side mount 21, and the rear lamp side mount hole 22a and the rear lamp side mount hole 22b are referred generally to as rear lamp side mount hole 22.

The fender 30 comprises the projection 31 being inserted into the mount hole 23 of the rear lamp unit 20. Also, the projection 31 is inserted into the mount hole 23 whereby the rear lamp unit 20 is temporarily placed on the fender 30.

The frame 40 comprises a frame side mount 41a provided with a frame side mount hole 42a, into which the grommet 50a described later is inserted, and a frame side mount 41b provided with a frame side mount hole 42b, into which the grommet 50b described later is inserted.

Also, the frame side mount hole 42a is a slot, of which length in the long-length direction of the left vehicle body cover 10a is larger than a length of the grommet 50a, inserted into the frame side mount hole 42a, in the long-length direction of the left vehicle body cover 10a, and of which length in the short-length direction of the left vehicle body cover 10a is substantially the same as that of the grommet 50a, inserted into the frame side mount hole 42a, in the short-length direction of the left vehicle body cover 10a. Likewise, the frame side mount hole 42b is a slot, of which length in the long-length direction of the right vehicle body cover 10b is larger than a length of the grommet 50b, inserted into the frame side mount hole 42b, in the long-length direction of the right vehicle body cover 10b, and of which length in the short-length direction of the right vehicle body cover 10b is substantially the same as that of the grommet 50b, inserted into the frame side mount hole 42b, in the short-length direction of the right vehicle body cover 10b.

In addition, the frame side mount 41a and the frame side mount 41b are referred generally to as frame side mount 41, and the frame side mount hole 42a and the frame side mount hole 42b are referred generally to as frame side mount hole 42.

The grommet 50a comprises a cylinder 51 that holds the projection 11a of the left vehicle body cover 10a. Likewise, the grommet 50b comprises a cylinder 51 that holds the projection 11b of the right vehicle body cover 10b. In addition, the grommet 50a and the grommet 50b are the same in structure and referred generally to as grommet 50.

Also, according to the embodiment, the grommet 50 is made of an elastic member such as rubber, etc.

Figure 4:
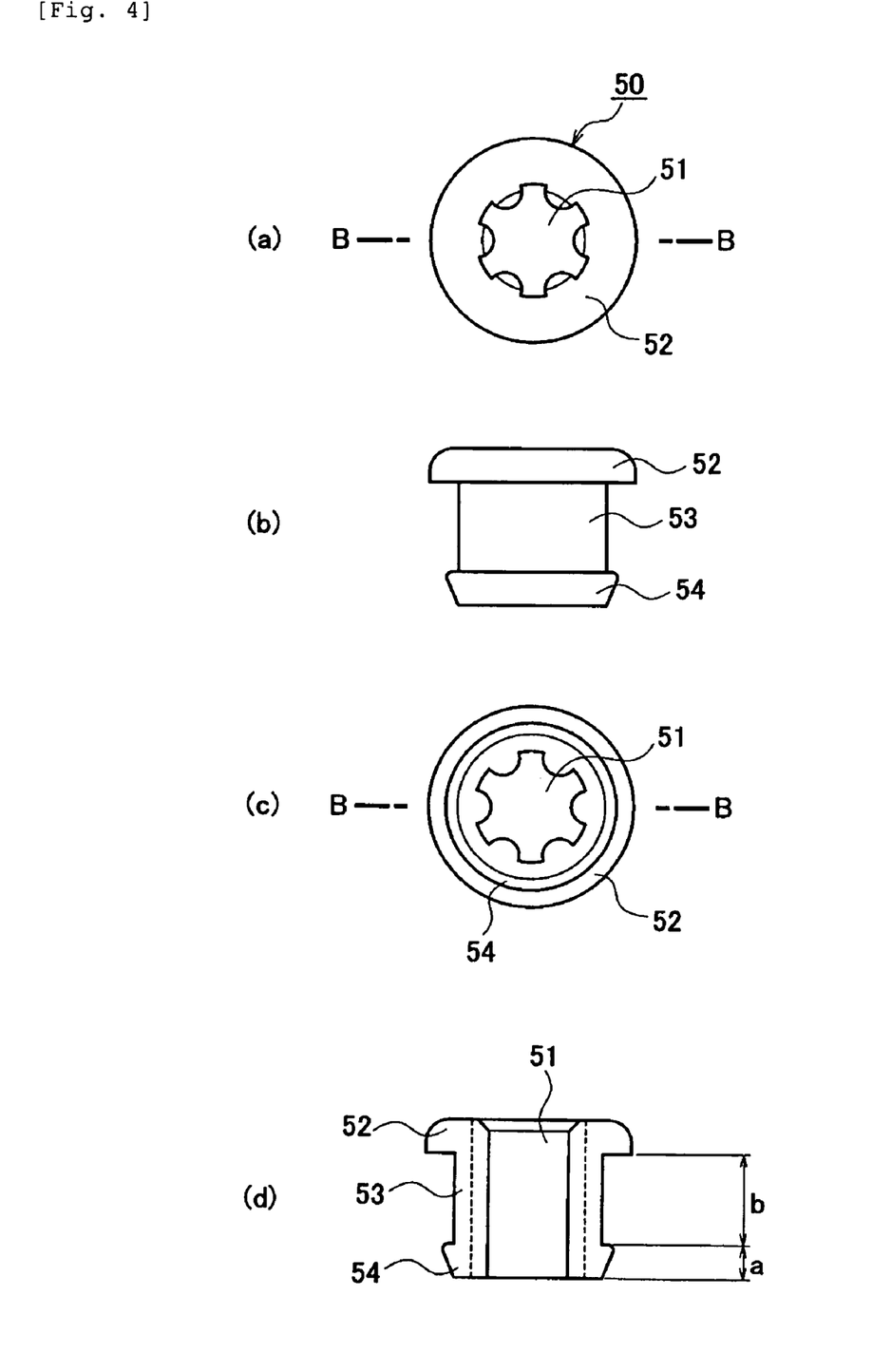
FIG. 4 is a view showing a grommet 50 according to the embodiment of the invention.

The grommet 50 according to the embodiment of the invention will be described below with reference to the drawings. FIG. 4 is a view showing the grommet 50 according to the embodiment of the invention.

In addition, FIG. 4(a) is a view showing the grommet 50 as viewed from outward in the widthwise direction of the saddle-ride type vehicle 1 in a state, in which the grommet 50 is inserted into the rear lamp side mount hole 22 and the frame side mount hole 42, and FIG. 4(b) is a view showing the grommet 50 as viewed in a traveling direction of the saddle-ride type vehicle 1 in a state, in which the grommet 50 is inserted into the rear lamp side mount hole 22 and the frame side mount hole 42. Also, FIG. 4(c) is a view showing the grommet 50 as viewed from inward in the widthwise direction of the saddle-ride type vehicle 1 in a state, in which the grommet 50 is inserted into the rear lamp side mount hole 22 and the frame side mount hole 42, and FIG. 4(d) is a cross sectional view showing a B cross section of the grommet 50.

As shown in FIGS. 4(a) to 4(d), the grommet 50 comprises a cylinder 51, an outer end 52, a drum portion 53, and an inner end 54, and is columnar-shaped.

The cylinder 51 holds the projection 11 of the vehicle body cover 10 described above. Also, the cylinder 51 is opened in a direction (in the embodiment, the widthwise direction of the saddle-ride type vehicle 1), in which the grommet 50 is inserted into the rear lamp side mount hole 22 and the frame side mount hole 42.

Further, the cylinder 51 is shaped (in the embodiment, an opened surface of the cylinder 51 is star-shaped) in a manner to hold the projection 11 so that the projection 11 once inserted does not come off. The outer end 52 comprises a projection projecting radially outwardly of the cylinder 51. That is, a cross section of the outer end 52 in parallel to the opened surface of the cylinder 51 extends outwardly of a cross section of the drum portion 53 in parallel to the opened surface of the cylinder 51.

Accordingly, since the projection of the outer end 52 is caught by the rear lamp side mount 21, the grommet 50 is hard to go inwardly of the rear lamp side mount hole 22 in the widthwise direction of the saddle-ride type vehicle 1.

The drum portion 53 is held by the rear lamp side mount 21 and the frame side mount 41 in a state, in which the grommet 50 is inserted into the rear lamp side mount hole 22 and the frame side mount hole 42.

Also, a length (b) of the drum portion 53 in a direction (in the embodiment, the widthwise direction of the saddle-ride type vehicle 1), in which the grommet 50 is inserted into the rear lamp side mount hole 22 and the frame side mount hole 42, is substantially the same as a distance ((b') described later) between the rear lamp side mount 21 and the frame side mount 41 in a direction, in which the grommet 50 is inserted.

The inner end 54 comprises a projection projecting radially outwardly of the cylinder 51. That is, a cross section of the inner end 54 in parallel to the opened surface of the cylinder 51 extends outwardly of the cross section of the drum portion 53 in parallel to the opened surface of the cylinder 51.

Accordingly, since the projection of the inner end 54 is caught by the rear lamp side mount 21 and the frame side mount 41, the grommet 50 becomes hard to come off outward in the widthwise direction of the saddle-ride type vehicle 1 when once inserted into the rear lamp side mount hole 22 from outward in the widthwise direction of the saddle-ride type vehicle 1. Likewise, the grommet 50 becomes hard to come off outward in the widthwise direction of the saddle-ride type vehicle 1 when once inserted into the frame side mount hole 42 from outward in the widthwise direction of the saddle-ride type vehicle 1.

Also, a length (a) of the inner end 54 in a direction (in the embodiment, the widthwise direction of the saddle-ride type vehicle 1), in which the grommet 50 is inserted into the rear lamp side mount hole 22 and the frame side mount hole 42, is equal to or less than a spacing ((a') described later) between the rear lamp side mount 21 and the frame side mount 41 in a direction, in which the grommet 50 is inserted.

Further, the projection of the inner end 54 is shaped so that an extension thereof radially outwardly of the cylinder 51 is enlarged as it goes from a side of the opened surface to the drum portion 53. Accordingly, the grommet 50 is readily inserted into the rear lamp side mount hole 22 and the frame side mount hole 42 from outward in the widthwise direction of the saddle-ride type vehicle 1, and becomes hard to come off outward in the widthwise direction of the saddle-ride type vehicle 1 when once inserted into the rear lamp side mount hole 22 and the frame side mount hole 42.

Figure 5:
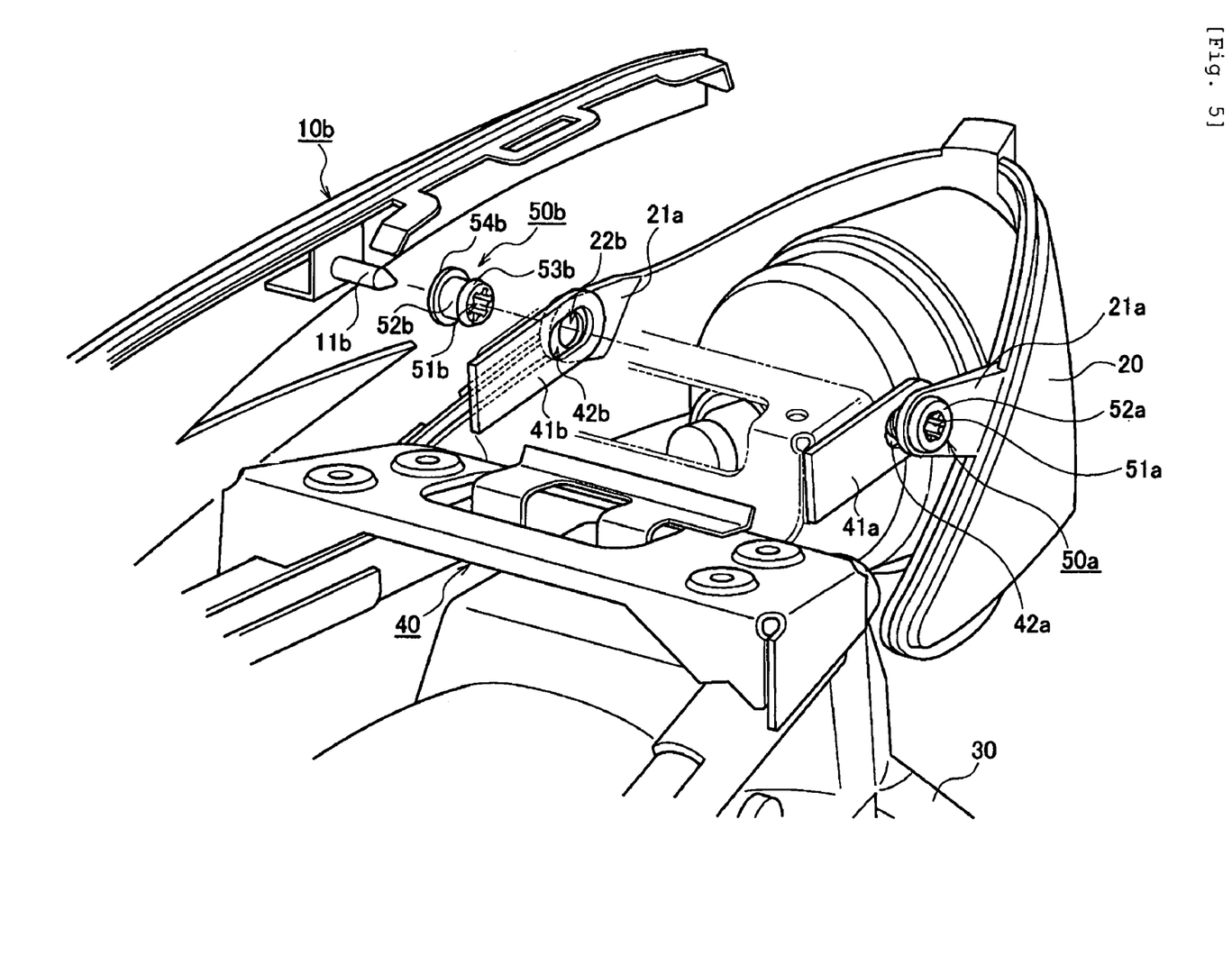
FIG. 5 is an exploded, perspective view showing the rear part of the saddle-ride type vehicle 1 according to an embodiment of the invention (second).

Details of a way to mount the vehicle body cover 10 and the rear lamp unit 20 to the frame 40 will be described below with reference to the drawings. FIG. 5 is a perspective view showing a rear part of the saddle-ride type vehicle 1 according to an embodiment of the invention.

As shown in FIG. 5, the grommet 50a is inserted into the rear lamp side mount hole 22a and the frame side mount hole 42a from outward in the widthwise direction of the saddle-ride type vehicle 1 whereby the rear lamp unit 20 is temporarily fixed to the frame 40. Likewise, the grommet 50b is inserted into the rear lamp side mount hole 22b and the frame side mount hole 42b from outward in the widthwise direction of the saddle-ride type vehicle 1 whereby the rear lamp unit 20 is temporarily fixed to the frame 40.

Here, as described above, the grommet 50 becomes hard to come off outward in the widthwise direction of the saddle-ride type vehicle 1 since the projection of the inner end 54 of the grommet 50 is caught by the rear lamp side mount 21 when once inserted into the rear lamp side mount hole 22 from outward in the widthwise direction of the saddle-ride type vehicle 1. Also, since the projection of the outer end 52 of the grommet 50 is caught by the rear lamp side mount 21, the grommet 50 is hard to go inwardly of the rear lamp side mount hole 22 in the widthwise direction of the saddle-ride type vehicle 1.

Accordingly, the rear lamp unit 20 is readily temporarily fixed to the frame 40 by inserting the grommet 50 into the rear lamp side mount hole 22 from outward in the widthwise direction of the saddle-ride type vehicle 1 and thereafter inserting the grommet 50 into the frame side mount hole 42b while sliding the grommet 50 along the frame side mount 41.

Also, the projection 11a (not shown in FIG. 5) of the left vehicle body cover 10a is inserted into the cylinder 50a of the grommet 50a, by which the rear lamp unit 20 is temporarily fixed to the frame 40. Likewise, the projection 11b of the right vehicle body cover 10b is inserted into the cylinder 50b of the grommet 50b, by which the rear lamp unit 20 is temporarily fixed to the frame 40.

Here, as described above, the grommet 50 becomes hard to come off outward in the widthwise direction of the saddle-ride type vehicle 1 since the projection of the inner end 54 of the grommet 50 is caught by the frame side mount 41 when once inserted into the frame side mount hole 42 from outward in the widthwise direction of the saddle-ride type vehicle 1. Also, since the projection of the outer end 52 of the grommet 50 is caught by the rear lamp side mount 21, the grommet 50 is hard to go inwardly of the rear lamp side mount hole 22 in the widthwise direction of the saddle-ride type vehicle 1.

Accordingly, the grommet 50 is held in a state, in which the rear lamp unit 20 is temporarily fixed to the frame 40, and the projection 11 of the vehicle body cover 10 is readily inserted into the cylinder 51 of the grommet 50, which temporarily fixes the rear lamp unit 20 to the frame 40.

Also, as described above, the frame side mount hole 42a is a slot, of which length in the long-length direction of the left vehicle body cover 10a is larger than a length of the grommet 50a, inserted into the frame side mount hole 42a, in the long-length direction of the left vehicle body cover 10a. Likewise, the frame side mount hole 42b is a slot, of which length in the long-length direction of the right vehicle body cover 10b is larger than a length of the grommet 50b, inserted into the frame side mount hole 42b, in the long-length direction of the right vehicle body cover 10b.

That is, since the frame side mount hole 42 has a play in the long-length direction of the vehicle body cover 10, a fitting position, in which the projection 11 of the vehicle body cover 10 is inserted into the cylinder 51 of the grommet 50 inserted into the rear lamp side mount hole 22 and the frame side mount hole 42, is adjusted by the play.

Figure 6:
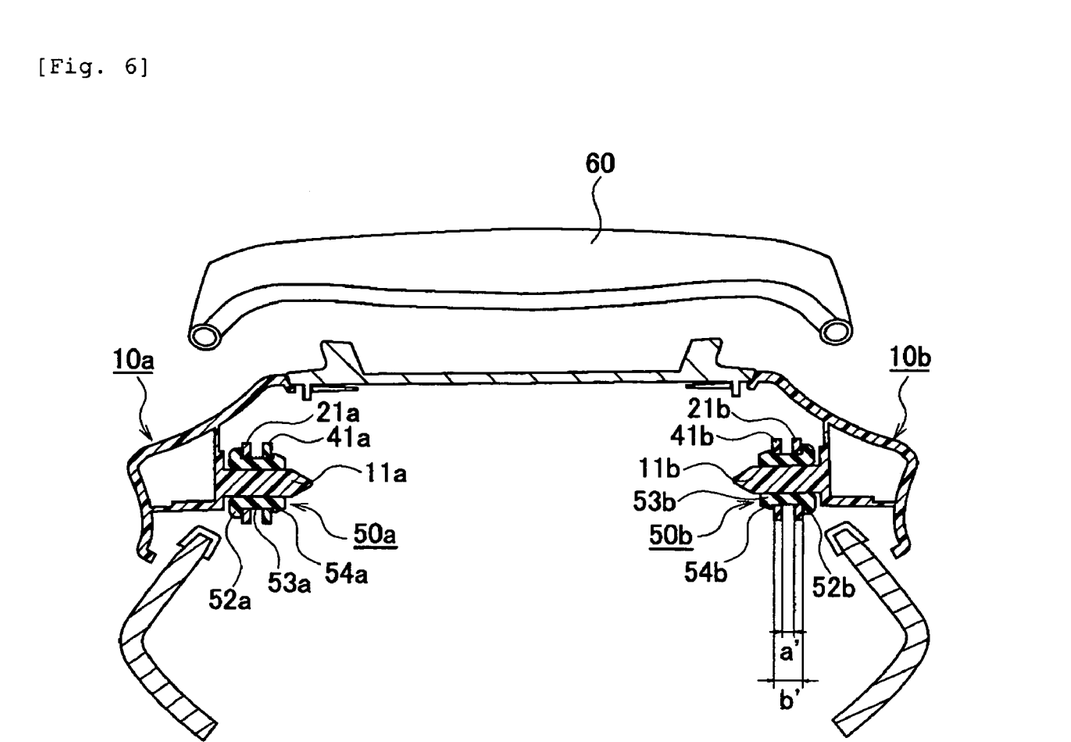
FIG. 6 is a view showing the positional relationship of a vehicle body cover 10, a rear lamp unit 20, a frame 40, and a grommet 50 according to the embodiment of the invention.

The positional relationship among the vehicle body cover 10, the rear lamp unit 20, the frame 40, and the grommet 50 according to the embodiment of the invention will be described below with reference to the drawings. FIG. 6 is a cross sectional view showing a cross section of the saddle-ride type vehicle 1 as viewed in an A direction in FIG. 1.

As shown in FIG. 6, the projection 11 of the vehicle body cover is inserted into the grommet 50 from outward in the widthwise direction of the saddle-ride type vehicle 1. Also, the rear lamp side mount 21 is positioned outwardly of the frame side mount 41 in the widthwise direction of the saddle-ride type vehicle 1. Further, the grommet 50 is held by the frame side mount 41 as well as the rear lamp side mount 21.

Also, a distance (b') between the rear lamp side mount 21 and the frame side mount 41 in a direction (in the embodiment, the widthwise direction of the saddle-ride type vehicle 1), in which the grommet 50 is inserted into the rear lamp side mount hole 22 and the frame side mount hole 42, is substantially the same as a length (b) of the drum portion 53.

In addition, the distance (b') between the rear lamp side mount 21 and the frame side mount 41 includes a thickness of the rear lamp side mount 21, in a direction, in which the grommet 50 is inserted, and a thickness of the frame side mount 41, in the direction, in which the grommet 50 is inserted.

That is, the distance (b') between the rear lamp side mount 21 and the frame side mount 41 corresponds to a distance between an outward surface of the rear lamp side mount 21 in the widthwise direction of the saddle-ride type vehicle 1 and an inward surface of the frame side mount 41 in the widthwise direction of the saddle-ride type vehicle 1.

Here, as described above, the grommet 50 is hard to go inward in the widthwise direction of the saddle-ride type vehicle 1 since the projection of the outer end 52 is caught by the rear lamp side mount 21, and hard to come out outward in the widthwise direction of the saddle-ride type vehicle 1 since the projection of the inner end 54 is caught by the frame side mount 41. Also, the distance (b') between the rear lamp side mount 21 and the frame side mount 41 is substantially the same as the length (b) of the drum portion 53 in the direction, in which the grommet 50 is inserted. That is, the grommet 50 is held in a state to temporarily fix the rear lamp unit 20 to the frame 40.

Also, the spacing (a') between the rear lamp side mount 21 and the frame side mount 41 in a direction (in the embodiment, the widthwise direction of the saddle-ride type vehicle 1), in which the grommet 50 is inserted into the rear lamp side mount hole 22 and the frame side mount hole 42, is larger than the length (a) of the inner end 54 in the direction, in which the grommet 50 is inserted.

In addition, the spacing (a') between the rear lamp side mount 21 and the frame side mount 41 does not include a thickness of the rear lamp side mount 21 in the direction, in which the grommet 50 is inserted, and a thickness of the frame side mount 41 in the direction, in which the grommet 50 is inserted.

That is, the spacing (a') between the rear lamp side mount 21 and the frame side mount 41 corresponds to a spacing between an inward surface of the rear lamp side mount 21 in the widthwise direction of the saddle-ride type vehicle 1 and an outward surface of the frame side mount 41 in the widthwise direction of the saddle-ride type vehicle 1.

Here, since the spacing (a') between the rear lamp side mount 21 and the frame side mount 41 is larger than the length (a) of the inner end 54, the grommet 50 can be readily inserted into the frame side mount hole 42 by once inserting the grommet 50 into the rear lamp side mount hole 22 and then sliding the grommet 50 along the frame side mount 41.

(Action and effect of the saddle-ride type vehicle according to the embodiment of the invention). With the saddle-ride type vehicle 1 according to the embodiment of the invention, the rear lamp unit 20 can be temporarily fixed to the frame 40 by inserting the grommet 50 into the frame side mount hole 42 and the rear lamp side mount hole 22. Also, three members composed of the vehicle body cover 10, the rear lamp unit 20, and the frame 40 can be readily assembled together by inserting the projection 11 of the vehicle body cover 10 into the cylinder 51 of the grommet 50, by which the rear lamp unit 20 is temporarily fixed to the frame 40.

Also, the grommet 50 having the cylinder 51, into which the projection 11 of the vehicle body cover 10 is inserted, is held by the frame side mount 41 as well as the rear lamp side mount 21 whereby it is possible to lessen a possibility that the projection 11 of the vehicle body cover 10 is damaged by vibrations, etc. generated while the saddle-ride type vehicle 1 travels.

Further, the frame side mount 41 supports the projection 11 of the vehicle body cover 10 on a tip end side (inward in the widthwise direction of the saddle-ride type vehicle 1) of the projection 11 of the vehicle body cover 10 whereby the frame side mount 41 can lessen stress applied to a root side (outward in the widthwise direction of the saddle-ride type vehicle 1) of the projection 11 of the vehicle body cover 10.

Also, the frame side mount hole 42 is a slot, of which length in the long-length direction of the vehicle body cover 10 is larger than a length of the grommet 50, inserted into the frame side mount hole 42, in the long-length direction of the vehicle body cover 10 (that is, there is a play in the long-length direction of the vehicle body cover 10), whereby a fitting position, in which the cylinder 51 of the grommet 50 inserted into the frame side mount hole 42 and the rear lamp side mount hole 22 and the projection 11 of the vehicle body cover 10 fit together, can be adjusted by the frame side mount hole 42 (play).

Specifically, while the vehicle body cover 10 is mounted to the frame 40 (or a member (for example, a battery BOX) mounted to the frame 40) on the front of the saddle-ride type vehicle 1, the frame side mount hole 42 can accommodate hole misregistration generated by a dimensional difference of the vehicle body cover 10 and the frame 40 (or a member mounted to the frame 40).

That is, a possibility that the vehicle body cover 10 cracks due to hole misregistration is lessened and the work of assembling three members composed of the vehicle body cover 10, the rear lamp unit 20, and the frame 40 together is further facilitated.

Also, since the grommet 50 is inserted into the frame side mount hole 42 and the rear lamp side mount hole 22 from outward in the widthwise direction of the saddle-ride type vehicle 1, the work of inserting the grommet 50 into the frame side mount hole 42 and the rear lamp side mount hole 22 is not hindered by those members (a part of the frame 40, a part of the rear lamp unit 20, etc.), which are disposed inward in the widthwise direction of the saddle-ride type vehicle 1, and the grommet 50 can be mounted to the frame side mount 41 and the rear lamp side mount 21.

Further, at least a part (a convex portion) of the cross section of the inner end 54 in parallel to the opened surface of the cylinder 51 extends outwardly of the cross section of the drum portion 53 in parallel to the opened surface of the cylinder 51, whereby the grommet 50 becomes hard to come off outward from the rear lamp side mount hole 22 in the widthwise direction of the saddle-ride type vehicle 1 since the convex portion of the inner end 54 is caught by the rear lamp side mount 21 when the grommet 50 is once inserted into the rear lamp side mount hole 22 from outward in the widthwise direction of the saddle-ride type vehicle 1.

Also, since the spacing (a') between the rear lamp side mount 21 and the frame side mount 41 is larger than the length (a) of the inner end 54, the grommet 50 can be inserted into the rear lamp side mount hole 22 by inserting the grommet 50 into the rear lamp side mount hole 22 and then sliding the grommet 50 along the frame side mount 41.

That is, the rear lamp unit 20 can be readily and temporarily fixed to the frame 40 by the grommet 50.

Further, at least a part (a convex portion) of the cross section of the inner end 54 in parallel to the opened surface of the cylinder 51 extends outwardly of the cross section of the drum portion 53 in parallel to the opened surface of the cylinder 51, whereby the grommet 50 becomes hard to come off outward in the widthwise direction of the saddle-ride type vehicle 1 since the convex portion of the inner end 54 of the grommet 50 is caught by the frame side mount 41 when the grommet 50 is once inserted into the frame side mount hole 42 from outward in the widthwise direction of the saddle-ride type vehicle 1.

Also, at least a part (a convex portion) of the cross section of the outer end 52 in parallel to the opened surface of the cylinder 51 extends outwardly of the cross section of the drum portion 53 in parallel to the opened surface of the cylinder 51, whereby the grommet 50 is hard to go inwardly of the rear lamp side mount hole 22 in the widthwise direction of the saddle-ride type vehicle 1 since the convex portion of the outer end 52 of the grommet 50 is caught by the rear lamp side mount 21.

Further, the distance (b') between the rear lamp side mount 21 and the frame side mount 41 is substantially the same as the length (b) of the drum portion 53.

Accordingly, the rear lamp side mount 21 and the frame side mount 41 restrict movements of the grommet 50 in the widthwise direction of the saddle-ride type vehicle 1 whereby positioning of the rear lamp unit 20 and the frame 40 in the widthwise direction of the saddle-ride type vehicle 1 is enhanced in accuracy.

Also, since the rear lamp side mount 21 and the frame side mount 41 hold the grommet 50 in a state, in which the rear lamp unit 20 is temporarily fixed to the frame 40, the work of inserting the projection 11 of the vehicle body cover 10 into the cylinder 51 of the grommet 50, which temporarily fixes the rear lamp unit 20 to the frame 40, is facilitated.

(Other embodiments). While the mode, described above, for carrying out the invention constitutes an embodiment of the invention, the invention is not limited to the embodiment. That is, the mode, described above, for carrying out the invention is susceptible to the following modifications.

Specifically, while the grommet 50 in the mode has been described as being inserted into the rear lamp side mount hole 22 and the frame side mount hole 42 from outward in the widthwise direction of the saddle-ride type vehicle 1, this is not limitative but the grommet 50 may be inserted into the rear lamp side mount hole 22 and the frame side mount hole 42 from inward in the widthwise direction of the saddle-ride type vehicle 1, or inserted in other directions (for example, a vertical direction of the saddle-ride type vehicle 1, a longitudinal direction of the saddle-ride type vehicle 1, and an oblique direction of the saddle-ride type vehicle 1).

Also, while the number of the grommets 50, which temporarily fixes the rear lamp unit 20 to the frame 40, in the embodiment has been described as being two (the grommet 50a and the grommet 50b), this is not limitative but the number of the grommets 50 may be one or two or three or more.

Further, while the grommet 50 in the embodiment has been described as having a columnar shape, this is not limitative but the grommet 50 may be in the form of a trigonal prism, a quadratic prism, or the like.

Also, while the grommet 50 in the embodiment has been described as having a shape, in which the opened surface of the cylinder 51 is star-shaped, this is not limitative but the grommet 50 may be shaped such that the opened surface of the cylinder 51 is in the form of a polygon, such as triangle, quadrangle, or the like, or a circle, or the like.

Further, while the rear lamp side mount 21 in the embodiment has been described as being arranged outwardly of the frame side mount 41 in the widthwise direction of the saddle-ride type vehicle 1, this is not limitative but the rear lamp side mount 21 may be arranged inwardly of the frame side mount 41 in the widthwise direction of the saddle-ride type vehicle 1.

Also, while the embodiment has been described with respect to an example, in which the rear lamp unit 20 is mounted to the frame 40, this is not limitative but a lamp unit being assembled to the frame 40 together with the vehicle body cover 10 suffices.

The invention claimed is:

1. A saddle-ride type vehicle comprising:
   a vehicle body cover that covers a vehicle body of the saddle-ride type vehicle from outside the saddle-ride type vehicle and comprises a protrusive projection being mounted to the vehicle body,
   a columnar-shaped member having a cylinder that holds the projection,
   a frame including a frame side mount provided with a frame side mount hole, and
   a lamp unit including a lamp side mount provided with a lamp side mount hole, and
   wherein the columnar-shaped member is inserted into the frame side mount hole and the lamp side mount hole, and shaped such that a length thereof in a direction of insertion, in which the columnar-shaped member is inserted into the frame side mount hole and the lamp side mount hole, is larger than a distance between the frame side mount and the lamp side mount in the direction of insertion, which includes the frame side mount and the lamp side mount, the cylinder is opened in the direction of insertion, and the projection is inserted into the cylinder and shaped such that a length thereof in the direction of insertion is larger than a distance between the frame side mount and the lamp side mount in the direction of insertion.

2. The saddle-ride type vehicle according to claim 1, wherein the frame side mount hole is a slot, of which length in a long-length direction of the vehicle body cover is larger than a length of the columnar-shaped member, inserted into the frame side mount hole, in the long-length direction of the vehicle body cover, and of which length in a short-length direction of the vehicle body cover is substantially the same as that of the columnar-shaped member, inserted into the frame side mount hole, in the short-length direction of the vehicle body cover.

3. The saddle-ride type vehicle according to claim 1, wherein the lamp side mount hole is a hole, of which length in a long-length direction of the vehicle body cover is substantially the same as that of the columnar-shaped member, inserted into the lamp side mount hole, in the long-length direction of the vehicle body cover, and of which length in a short-length direction of the vehicle body cover is substantially the same as that of the columnar-shaped member, inserted into the lamp side mount hole, in the short-length direction of the vehicle body cover.

4. The saddle-ride type vehicle according to claim 1, wherein the lamp side mount is arranged further outside the saddle-ride type vehicle than the frame side mount.

5. The saddle-ride type vehicle according to claim 1, wherein the columnar-shaped member comprises a drum portion held by the lamp side mount and the frame side mount, an inner end positioned further inside the saddle-ride type vehicle than the drum portion, and an outer end positioned further outside the saddle-ride type vehicle than the drum portion, at least a part of a cross section of the inner end in parallel to an opened surface of the cylinder extends outwardly of a cross section of the drum portion in parallel to the opened surface, at least a part of a cross section of the outer end in parallel to the opened surface extends outwardly of the cross section of the drum portion in parallel to the opened surface, and a length of the drum portion in the direction of insertion is substantially the same as a distance between the frame side mount and the lamp side mount in the direction of insertion.

6. The saddle-ride type vehicle according to claim 1, wherein the columnar shaped member comprises a drum portion held by the lamp side mount and the frame side mount, and an inner end positioned further inside the saddle-ride type vehicle than the drum portion, at least a part of a cross section of the inner end in parallel to an opened surface of the cylinder extends outwardly of a cross section of the drum portion in parallel to the opened surface, and a length of the inner end in the direction of insertion is equal to or less than that spacing between the frame side mount and the lamp side mount in the direction of insertion, which does not include the frame side mount and the lamp side mount.

* * * * *